Patented June 7, 1932

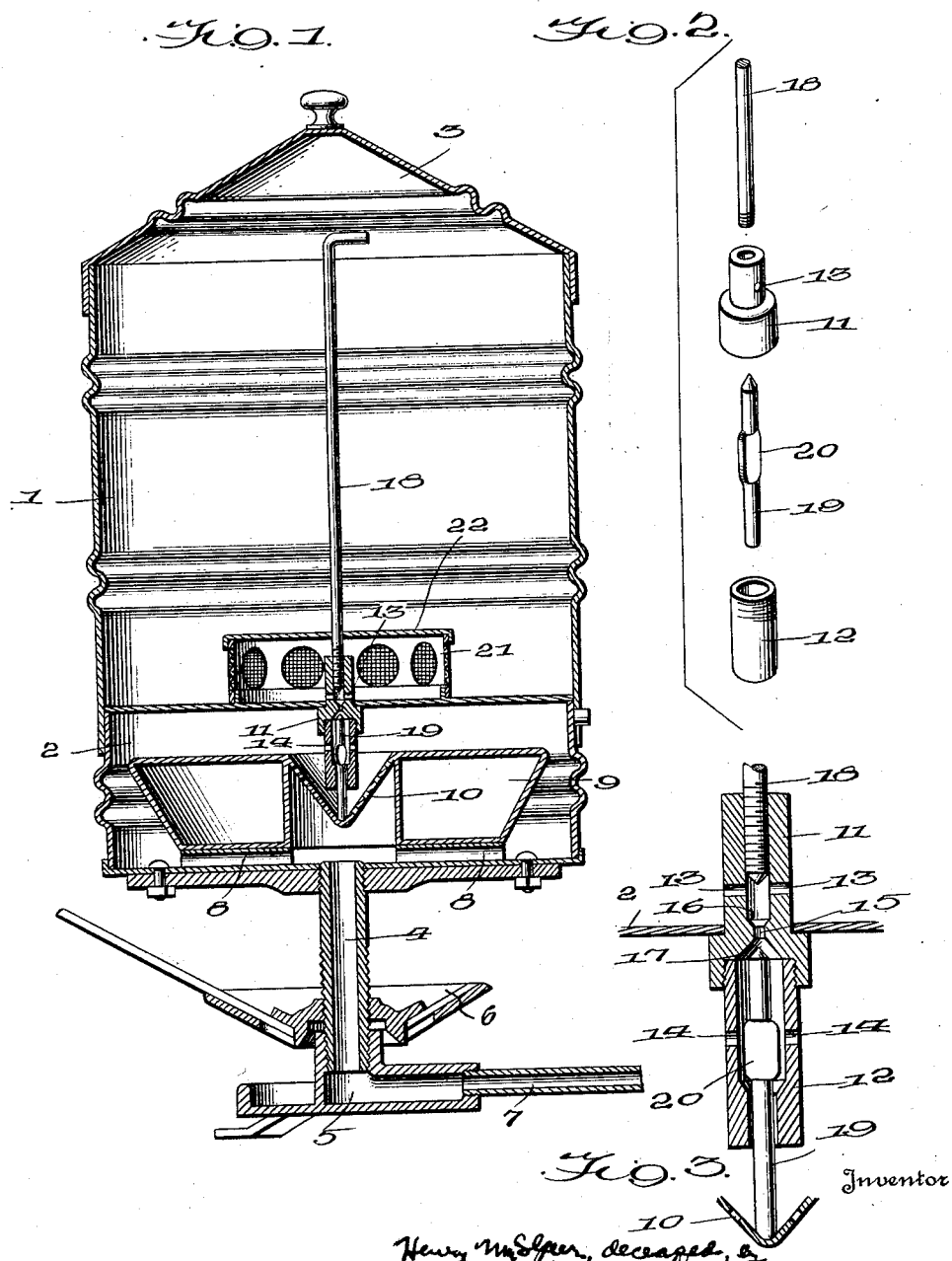

1,862,039

UNITED STATES PATENT OFFICE

HENRY M. SHEER, DECEASED, LATE OF QUINCY, ILLINOIS, BY GRANT IRWIN, ADMINISTRATOR, OF QUINCY, ILLINOIS, ASSIGNOR TO H. M. SHEER COMPANY, OF QUINCY, ILLINOIS, A CORPORATION OF ILLINOIS

VALVE

Original application filed November 17, 1923, Serial No. 675,386. Divided and this application filed October 6, 1927. Serial No. 224,485.

This invention relates to an improvement in valves, and is a division of the copending application Serial No. 675,386, filed November 17, 1923.

The object of the invention is to provide a simple multiple valve, especially for use in connection with oil containers for supplying oil to brooder heaters, and which valve will be not only simple in construction but also reliable in action so that it may be regulated to admit the proper quantity of oil to the heater and also be controlled by a float associated with the oil container for maintaining the proper oil level in the burner.

The invention is of the character of multiple valves, in which a valve casing has oppositely disposed valve-seats and is made in two parts, detachably connected together with a valve carried by each part in position to engage the oppositely disposed seats for regulating the flow of fluid through the casing. One of the valves is a manually controlled cut-off valve and is normally disposed within the oil tank, where as the other is a slidably mounted float controlled needle valve and normally disposed within the float chamber. These two valves provide a positive control for the flow of oil from the oil tank to the heater.

In the accompanying drawing:

Fig. 1 is a sectional view through an oil tank showing the relation of the valve thereto;

Fig. 2 is a disassembled perspective view of the valve removed; and

Fig. 3 is an enlarged sectional view through the valve.

The numeral 1 represents the oil tank which has a float chamber 2 connected therewith, as clearly shown in Fig. 1, the two being fitted together with the oil tank disposed upon the float chamber. The oil tank is provided with a removable cover 3 for closing the top thereof.

The float chamber 2 is supported upon a stem 4 which extends upwardly from a base 5 and is held in an adjusted position by means of a lock-wheel 6. The stem 4 establishes communication between the float chamber 2 and an outlet pipe 7, which extends to a brooder heater or wherever it is desired to supply oil or fluid from the chamber 1.

Mounted within the float chamber 2 are float rests 8 which radiate from the opening of the stem 4 in the float chamber, and these float rests normally hold a float 9 which is also loosely mounted in the float chamber in spaced apart relation from the bottom thereof. The float 9 is provided with a reticulated cone 10 which is inverted and has its upper edges secured about a central opening through the float 9.

A valve casing is connected with the top of the float chamber 2 for establishing communication between the oil tank and float chamber and is provided with upper and lower sections 11 and 12, the upper section 11 being fixed tightly in the top of the float chamber 2 whereas the lower section is carried by the upper section and is screwed into an enlarged portion thereof for removably holding the two together.

The upper section 11 is provided with radially arranged orifices 13 and the lower section 12 has similar orifices 14 arranged in the walls thereof.

The upper section 11 is provided with a constricted passage 15 therethrough, on the opposite ends of which oppositively disposed valve-seats 16 and 17 are formed. A cut-off valve 18 is adjustable longitudinally through the upper section 11 and has screw-threaded engagement therein for this purpose and is in position to cooperate with and engage the valve-seat 16 for controlling the passage of fluid from the orifices 13 to the central opening 15. A needle valve 19 is slidably supported by the lower section 12, having a flared portion 20 for this purpose, and the upper end of this needle valve is adapted to engage the valve-seat 17 for also controlling the flow of fluid through the central passage 15. The lower end of the valve stem 19 extends outward through the lower section 12 and is in position to be engaged by the reticulated cone 10, as shown in Figs. 1 and 3. The cut-off valve 18 preferably extends to a point near the top of the oil tank 1 so that easy access may be obtained thereto for regulating or cutting off the flow of fluid from the oil tank into the float chamber.

A strainer ring 21 surrounds the orifices 13 and the upper section of the valve, through which strainer ring the oil passes to the outlet orifices 13. The purpose of this is to remove excessive impurities in the oil to prevent them from being carried to the burner. A removable cap 22 covers the top of the strainer ring, as shown in Fig. 1.

In the operation of the invention, the cut-off valve 18 is regulated to supply the proper flow of oil into the float chamber 2 and as the oil rises in this float chamber the float 9 will be raised to slide the needle valve 19 upward through the lower section 12 of the valve casing to decrease the flow of oil through the central opening 15, or to cut off this flow altogether. As the oil is fed to the burner and consumed thereby, it will gradually lower in the float chamber 2, allowing the valve-stem 19 to be moved away from the valve-stem 17, thereby permitting of a greater flow of oil from the oil tank into the float chamber. The oil passes through the straining screens of the ring 21 to remove excessive impurities therefrom and through the orifices 13 and central opening 15 about the valve-stems 18 and 19 and out through the orifices 14 of the lower section 12 into the chamber 2, from where it passes through the stem and tube 4 and 7 to the burner.

The multiple valve located between the oil tank and float chamber maintains a positive control over the oil in its passage from the oil tank to the float chamber, and the construction being simple in its nature is therefore inexpensive to manufacture and will not get out of working condition. The two sections of the valve casing being secured together permits of the removal of the lower one for cleaning out the valve casing, and removing any sediment that may get thereinto and tend to hinder the action of the valves.

Claims:—

1. A valve including a valve-stem guide formed of sections screwed together, each of said sections having radial openings therein, one of said sections having an opening therethrough and oppositely disposed valve-seats, a manually controlled valve extending into position to engage one of said valve-seats, and a needle valve carried by and having slidable connection with the other section and in position to engage the other valve-seat.

2. The combination of a casing formed of sections secured together, one of said sections having oppositely disposed communicating valve-seats therein, a manually controlled valve carried by one of said sections in position to engage one of the valve-seats, said section having radially arranged inlet openings communicating with the last mentioned valve-seat, a needle valve carried by and having slidable connection with the other section in position to engage the other valve-seat, and radially arranged openings in the last-mentioned section communicating with the last-mentioned valve-seat.

3. A valve of the character described comprising two sections detachably connected together, one of said sections having a reduced orifice therethrough, oppositely-disposed valve-seats on opposite sides of said orifice, a valve carried by said section in position to engage one of said valve-seats, a needle-valve carried by and suspended within the other section in position to engage the other valve-seat, and fluid openings on opposite sides of the valve-seats.

4. A valve of the character described comprising at least two sections, one of which is detachably screw-threaded to an end of the other and having a reduced orifice therethrough, oppositely disposed valve seats on opposite sides of said orifice in said first section, a needle valve slidably carried by and suspended within the other section in position to engage one of the valve seats, and an outwardly flared portion formed on the needle valve and spaced from the point thereof for preventing longitudinal displacement of said needle valve from said section.

5. A valve of the character described comprising at least two sections having the ends thereof detachably connected together, one of said sections having a reduced orifice therethrough, said section having the outer end thereof internally screw-threaded, a control valve extending through said threaded portion in position to control one end of the orifice, said section having one or more discharge openings through a side thereof between the threaded portion and the orifice, the second section having the outer end thereof reduced, and a needle valve slidably mounted in said reduced end, and having a side flared portion spaced from the point thereof for holding the needle valve against removal, the point of said needle valve controlling an end of the orifice, said second section having one or more side openings therethrough approximately between the orifice and the flared portion of the needle valve in normal position.

6. A valve of the character described comprising at least two sections having the ends thereof detachably connected together, one of said sections having an orifice therethrough, the other section having an enlarged internal recess forming a needle valve chamber and having the outer end thereof reduced with an opening therethrough, and a needle valve slidably mounted in said needle valve chamber and having an end thereof protruding through the end opening, the opposite end of said needle valve being in position to control the orifice, said needle valve having a swaged portion spaced from the last-mentioned end thereof for preventing removal thereof through the end opening.

In testimony whereof I affix my signature.

GRANT IRWIN,
*Administrator of Henry M. Sheer, Deceased.*